(12) United States Patent
Kalajan (10) Patent No.: US 10,776,160 B2
(45) Date of Patent: Sep. 15, 2020

(54) MANAGEMENT OF SEQUENCED EXECUTION OF SERVICE TASKS IN A MULTI-SERVICE SYSTEM

(71) Applicant: McGraw-Hill Global Education Holdings, LLC, New York, NY (US)

(72) Inventor: Kevin Kalajan, Arroyo Grande, CA (US)

(73) Assignee: McGraw Hill LLC, New York, NY (US)

( * ) Notice: Subject to any disclaimer, the term of this patent is extended or adjusted under 35 U.S.C. 154(b) by 61 days.

(21) Appl. No.: 15/856,184

(22) Filed: Dec. 28, 2017

(65) Prior Publication Data

US 2019/0205162 A1 Jul. 4, 2019

(51) Int. Cl.
G06F 9/48 (2006.01)
G06F 9/46 (2006.01)

(52) U.S. Cl.
CPC ............ *G06F 9/4881* (2013.01); *G06F 9/466* (2013.01)

(58) Field of Classification Search
None
See application file for complete search history.

(56) References Cited

U.S. PATENT DOCUMENTS

| | | | |
|---|---|---|---|
| 2008/0288949 A1* | 11/2008 | Bohra | G06F 9/4881 718/104 |
| 2014/0075239 A1* | 3/2014 | Prathipati | H04L 29/14 714/4.1 |
| 2015/0309918 A1* | 10/2015 | Raghavan | G06F 11/3688 714/38.1 |
| 2016/0350160 A1* | 12/2016 | Hamway | H04L 41/0806 |
| 2017/0116309 A1* | 4/2017 | Menon | G06F 16/245 |
| 2018/0150299 A1* | 5/2018 | Balle | H04L 41/0816 |
| 2018/0196809 A1* | 7/2018 | Wen | G06F 9/466 |
| 2018/0329752 A1* | 11/2018 | Kokubo | G06F 9/5038 |

* cited by examiner

Primary Examiner — Meng Ai T An
Assistant Examiner — Zujia Xu
(74) Attorney, Agent, or Firm — Lowenstein Sandler LLP (57) ABSTRACT

A method and system for optimizing the interaction and execution of multiple service tasks associated with a logical transaction. The multiple components or "legs" of the transaction consisting of tasks executable by a computing service or software as a service (SAAS) endpoint are identified. The system determines a strategy type or belief level associated with each of the service tasks included in a transaction. The belief level may be categorized as either "optimistic" or "pessimistic" based on one or more performance parameters (e.g., a probability of failure of a service and an expense associated with a failure of the service) derived from historical data associated with a particular transaction or service task. A sequence of execution for the multiple service tasks associated with the transaction is determined based at least in part on the belief level associated with each of the multiple service tasks. In one embodiment, one or more unordered service tasks classified as pessimistic are performed before one or more unordered service tasks classified as optimistic.

14 Claims, 6 Drawing Sheets

| | | | | | |
|---|---|---|---|---|---|
| | | Transaction ABC | | | |
| Service task Identifier | Dependencies? | Ordered or Unordered task | Optimistic or Pessimistic | Belief level score | Sequence of execution |
| Service task 1 | YES | Ordered | N/A | N/A | Before service 4 |
| Service task 2 | NO | Unordered | Optimistic | 2.3 | Parallel with other unordered tasks |
| Service task 3 | NO | Unordered | Pessimistic | 6.8 | 3 |
| Service task 4 | YES | Ordered | N/A | N/A | After service 1 |
| Service task 5 | NO | Unordered | Pessimistic | 8.9 | 1 |
| Service task N | NO | Unordered | Pessimistic | 7.4 | 2 |

| Transaction ABC | | | | | |
|---|---|---|---|---|---|
| Service task Identifier | Dependencies? | Ordered or Unordered task | Optimistic or Pessimistic | Belief level score | Sequence of execution |
| Service task 1 | YES | Ordered | N/A | N/A | Before service 4 |
| Service task 2 | NO | Unordered | Optimistic | 2.3 | Parallel with other unordered tasks |
| Service task 3 | NO | Unordered | Pessimistic | 6.8 | 3 |
| Service task 4 | YES | Ordered | N/A | N/A | After service 1 |
| Service task 5 | NO | Unordered | Pessimistic | 8.9 | 1 |
| Service task N | NO | Unordered | Pessimistic | 7.4 | 2 |

FIG. 6

MANAGEMENT OF SEQUENCED EXECUTION OF SERVICE TASKS IN A MULTI-SERVICE SYSTEM

BACKGROUND

Many transaction-based computing systems are monolithic and perform operations within a single computing service. However, a trend has emerged toward decomposition into multiple interoperable computing services (also referred to as a "service" or "services") performing one or more tasks. Frequently, to execute a larger transaction, the transaction is decomposed into many different tasks to be performed by various different components or services.

In some instances, the tasks performed by the services are dependent on one another (e.g., a first service performs a first task to produce an output that is used as an input to a second service). For example, a traditional database transaction may involve multiple dependent services (e.g., an entitlement service, an identity service, an organization service, an authentication service, an authorization service, a functional service (e.g., scoring for an assessment, etc.)) configured to perform multiple different tasks.

However, a transaction may fail due to the presence of inconsistent states across the multiple inter-dependent services resulting from a failure or issue with one or more of the services. In addition, the failure of one service upon which one or more other services are dependent requires the backing out or reversal of execution of other dependent services.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Embodiments described herein relate to systems and methods for optimizing the interaction and execution of multiple service tasks associated with a logical transaction. In one embodiment, multiple components or "legs" associated with a transaction are identified. The legs of the transaction consist of a task executable by a computing service or software as a service (SAAS) endpoint (herein referred to as a "service"). In one embodiment, the system manages the requests to each service for the performance of the tasks associated with the transaction.

In one embodiment, the system determines a strategy type or belief level associated with each of the service tasks included in a transaction. In one embodiment, the belief level may be categorized as either "optimistic" or "pessimistic". In one embodiment, the belief level may be determined based on one or more performance parameters. In one embodiment, the performance parameters may include a probability of failure of a service and an expense associated with a failure of the service. For example, the performance parameters may include an indication or calculated value associated with a probability of failure for a service task (e.g., a low, neutral, or high value). In another example, the performance parameters may include an impact (e.g., cost or expense) of a failure of service task (e.g., low cost, neutral cost, or high cost in terms of the time, resources, and complexity associated with reversal of the service task).

In one embodiment, based on the performance parameters, a belief level score is generated that enables the classification of the service task as either optimistic or pessimistic on a relative scale. For example, a belief level scale (e.g., from 0 to 10) may be implemented wherein a score of "0" represents a highly optimistic service task and a score of "10" represents a highly pessimistic service task. In one embodiment, a pessimistic threshold value may be designated such that a belief level score below the threshold value indicates that the associated service tasks is optimistic and a belief level score equal to or above the threshold value indicates that the associated service task is pessimistic, as described in greater detail below.

In one embodiment, a service task identified as optimistic may have a low probability of failure, a low expense associated with a failure, or a combination thereof. In one embodiment, for each of the performance parameters (e.g., failure probability, failure expense, etc.) for a particular service task, a weighted value may be calculated based on historical data associated with that service task.

In one embodiment, a service task identified as pessimistic may have a higher relative probability of failure or a higher relative cost or expense associated with a failure. In one embodiment, the belief level score may be calculated and compared to a threshold value to determine if a service task is to be classified as pessimistic (e.g., if the calculated belief level score exceeds the threshold value). In addition, the belief level score may be used to compare and rank multiple service tasks based on their respective belief level score (e.g., a higher belief level score for a particular service task equates to a higher relative level of pessimism associated with that service task).

In one embodiment, a sequence of execution for multiple service tasks associated with a transaction is determined based at least in part on the belief level associated with the multiple service tasks. In one embodiment, one or more service tasks classified as pessimistic are performed before one or more service tasks classified as optimistic.

In one embodiment, a transaction may be composed of multiple service tasks that are ordered, unordered, or a hybrid (e.g., a combination of both ordered and unordered service tasks). In one embodiment, ordered service tasks are dependent on one or more other tasks. In one embodiment, ordered service tasks are executed serially and in a particular order, as determined in accordance with the dependencies.

Unordered service tasks are not dependent on one or more other tasks. In one embodiment, unordered tasks may be executed in parallel with one another. In one embodiment, the sequence of the execution of the unordered service tasks is determined based at least in part on the belief level associated with each of the unordered service tasks. In one embodiment, for a set of unordered service tasks, a first portion identified as optimistic are executed in a parallel. In one embodiment, a second portion identified as pessimistic are performed in a descending order based on the respective belief level score associated with each of the respective service tasks.

Advantageously, according to embodiments, execution of a transaction including the performance of multiple service tasks is improved by identifying a relative belief level (e.g., optimistic or pessimistic) for each of the service tasks and establishing a sequence of execution of the tasks based on the identified belief level, as described in greater detail below with respect to FIGS. 2-6.

Figure 1:
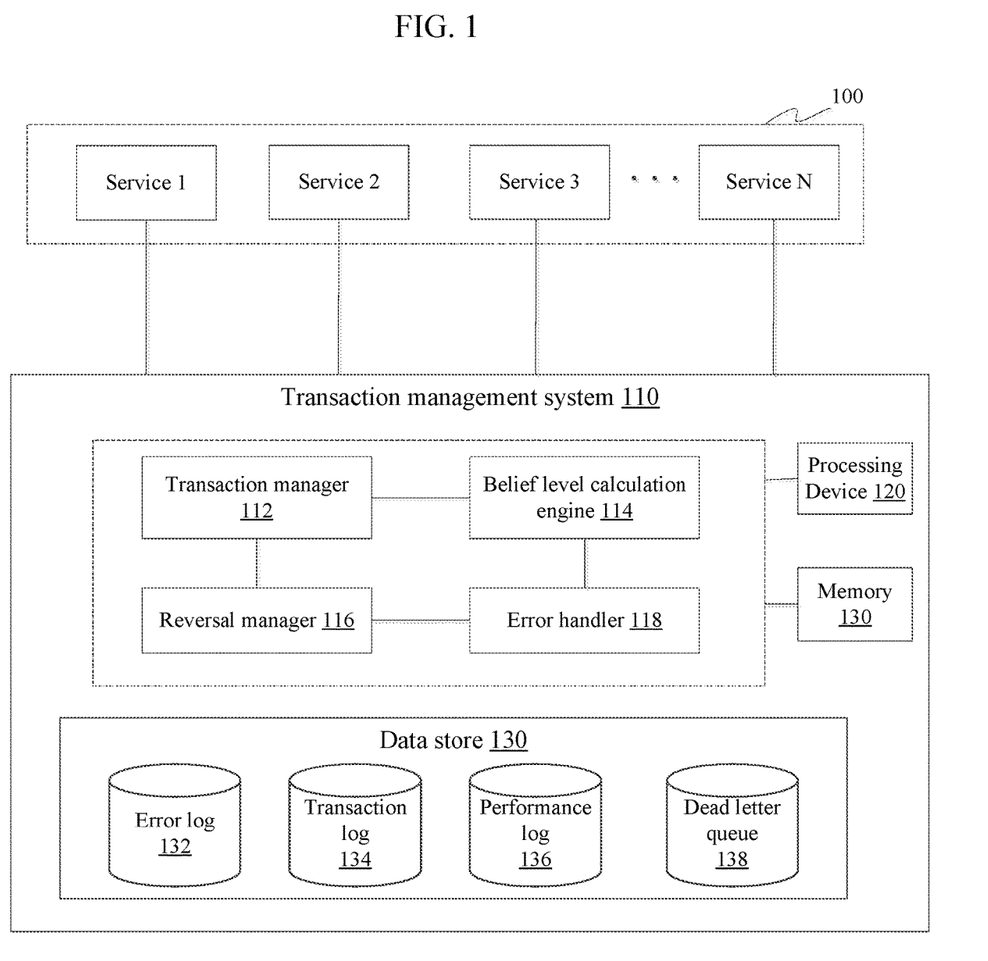
FIG. 1 illustrates an example environment including a multi-component transaction management system, according to one embodiment.

FIG. 1 is a block diagram illustrating an example computing environment including a transaction management system 110 operatively coupled to multiple computing services (e.g., service 1, service 2, service 3, and service N of FIG. 1) or SAAS applications 100 (herein collectively referred to as "services"). In one embodiment, the transaction management system 110 is configured to manage a performance of a transaction composed of multiple related service tasks (e.g., tasks performed by the multiple services 100). For example, a transaction may be an N-component (or leg) transaction, wherein N service tasks are performed by the respective services 100 to enable the execution of the transaction. In one embodiment, the execution of the multiple service tasks identified for a transaction is managed by the transaction management system 110. In one embodiment, the transaction management system 110 may communicate with the services 100 via a suitable network (not shown), including, for example, the Internet, intranets, extranets, wide area networks (WANs), local area networks (LANs), wired networks, wireless networks, or other suitable networks, etc., or any combination of two or more such networks. In one embodiment, the transaction management system 110 includes one or more components or modules, such as a transaction manager 112, a belief level calculation engine 114, a reversal manager 116 and an error handler 118, configured to perform the functions, operations, and features described in detail herein. In one embodiment, the transaction management system 110 includes a data store 130 configured to store information and data associated with the transaction management system 110, including an error log 132, a transaction log 134, a performance log 136, and a dead letter queue 138. It is noted that the data store 130 may be any suitable type of computer-readable memory and may reside, in whole or in part, locally within the transaction management system 110 or in a remote location accessible by the transaction management system 110 via a suitable network. In one embodiment, the transaction management system 110 may further include a processing device 134 and a memory 136 configured to execute and store instructions associated with the functionality of the various components, services, modules, execution engines, applications, and programs of the transaction management system 110, as described in greater detail below in connection with FIGS. 2-5.

In one embodiment, the transaction manager 112 identifies a request for the execution of a transaction and identifies the multiple service tasks to be executed in accordance with the identified transaction. In one embodiment, the transaction manager 112 may analyze the transaction to enumerate the services (e.g., service 1, service 2, service 3, and service N of FIG. 1) involved and the specific service tasks (e.g., a functional and semantic description) that are to be performed by each respective service. In one embodiment, the transaction manager 112 identifies dependent relationships among the identified services. In one embodiment, the transaction manager 112 stores data associated with the transaction and execution of the associated service tasks in a transaction log 134 of the data store 130.

In one embodiment, a set of ordered services are identified including the services that are dependent on an outcome, output, or result of another service. In one embodiment, a dependency table may be identified or generated that lists the service tasks that are dependent on one or more other services. In one embodiment, the one or more service tasks that have dependencies are grouped into a set of ordered tasks. In one embodiment, based on the dependencies, a sequence of execution of the ordered tasks (e.g., a serial execution sequence based on the relationships between the dependent service tasks) is calculated by the transaction manager 112.

For example, a service task may be a non-read only operation (e.g., insert, rename, delete, etc.) that may be executed following the sending of a request to another service task for input data. In this example, a first service task may be directed to adding a new user and generating a new user identifier. The new user identifier may be used as a request to a second service task. In this example, a dependency is identified between the first and the second service tasks, and thus these service tasks are classified as ordered (e.g., the first service task is to be executed before the second service task).

In one embodiment, the transaction manager 112 identifies a set of independent or unordered service tasks (e.g., a set of service tasks associated with the transaction that has no dependency). In one embodiment, the belief level calculation engine 114 determines a relative belief level for each of the unordered services tasks. In one embodiment, the relative belief level is a measurement used to determine a classification of a service task as either optimistic or pessimistic. In one embodiment, a belief level score is calculated for each unordered service task to determine a relative optimism or pessimism associated with the service task. For example, a relative scoring scale may be established (e.g., a scale of 0 to 10, wherein a score of 0 indicates a high degree of optimism and a score of 10 indicates a high degree of pessimism). In one embodiment, a threshold value may be established with respect to the belief level scale, such that a service or service task with a score equal to or exceeding the threshold value is identified as pessimistic. In one embodiment, a service or service task with a score below the threshold value is identified as optimistic.

In one embodiment, the belief level for a particular service or service task may be determined based on one or more performance parameters associated with that service task. In one embodiment, the performance parameters may be determined based on historical data associated with the service (e.g., data collected based on previous operation of the service, execution of a service task, execution of the transaction, etc.). In one embodiment, the performance parameters may include: 1) a probability of failure of a service, and 2) an impact or expense associated with a failure of a service. For example, the performance parameters may be include an indication or calculated value associated with a probability of failure for a service task (e.g., a low, neutral, or high value). In another example, the performance parameters may include an impact (e.g., cost or expense) of a failure of service task (e.g., low cost, neutral cost, or high cost in terms of the time, resources, and complexity associated with reversal of the service task). In one embodiment, the transaction manager 112 stores data associated with the transaction and execution of the associated service tasks in a transaction log 134 of the data store 130. In one embodiment, data associated with performance of the transactions and service tasks may be stored in the performance log 136 of the data store 130. The performance data in the performance log 136 may be updated on a dynamic basis to enable the belief level scores to be calculated dynamically (e.g., on an on-going basis at a time a request for a service task is sent by the transaction manager 112).

In one embodiment, the transaction manager 112 determines an order of execution for the unordered service tasks based on the belief level score associated with each of the respective service tasks. In one embodiment, unordered service tasks that are identified as optimistic are executed in parallel. In one embodiment, unordered service tasks that are identified as pessimistic are executed in descending order based on the corresponding belief level score. For example, a first pessimistic unordered service having a belief level score of 9.8 is performed first and a second pessimistic unordered service having a belief level score of 9.1, and so on. An example is described in greater detail below with respect to FIG. 5. In one embodiment, a contributing factor to the belief level may be a number of steps required for reversal as compared to a reversal complexity. For example, if step N requires N–1 reversals, one embodiment may use this as a distinguishing factor in lieu of complexity calculations for each step. In one embodiment, this heuristic may be employed alone or in combination with more sophisticated measures of reversal complexity.

In one embodiment, the error handler 118 identifies a failure of a service task (e.g., a request from the transaction manager 112 to a service 100) and analyzes the failure to determine a type or nature of the failure. For example, a service task error may be a connection time out, execution time out, duplicate task error, insufficient resources, etc. Based on the error type, the error handler 118 determines a next step for the failed service task. In one embodiment, the next step may include a retry of the service task, a backing out associated with the service task (e.g., not retrying) using the belief level associated with the failed service task. In one embodiment, a retry is executed more aggressively (e.g., re-tried with a greater frequency until completed) for pessimistic type service tasks. In one embodiment, for a failed service task having a high pessimistic belief level score (e.g., 9.0 on the scale identified above), a retry plan may be executed that calls for the retry of the failed service task on a periodic basis (e.g., every 1 millisecond, every 100 milliseconds, every second, etc.)

In one embodiment, the reversal manager 116 identifies service tasks to be reversed in view of a failure of one or more service tasks. In one embodiment, a state of a service task is stored prior to imitation of that service task to enable reversal of the service task if it fails. Upon failure of the service task, the transaction is reversed by returning the failed service task to its original (pre-initiation) state. In one embodiment, the reversal manager 116 implements retry logic in the case of a failure. The retry logic may maintain a status of a failed state if retries continue past an established retry threshold (e.g., a window or amount of time allocated for retrying a failed service task) during which the failed service task cannot be reversed (e.g., the system failed during the transaction request and did not return to operation during the allocated window of time). In one embodiment, a record associated with the failed service task is flagged as being in an inconsistent state, wherein the dead letter queue 138 is implemented to restore the service task to a consistent state and remove the flag upon completion. According to embodiments, any suitable system or methodology may be used to restore state consistency.

Figure 2:
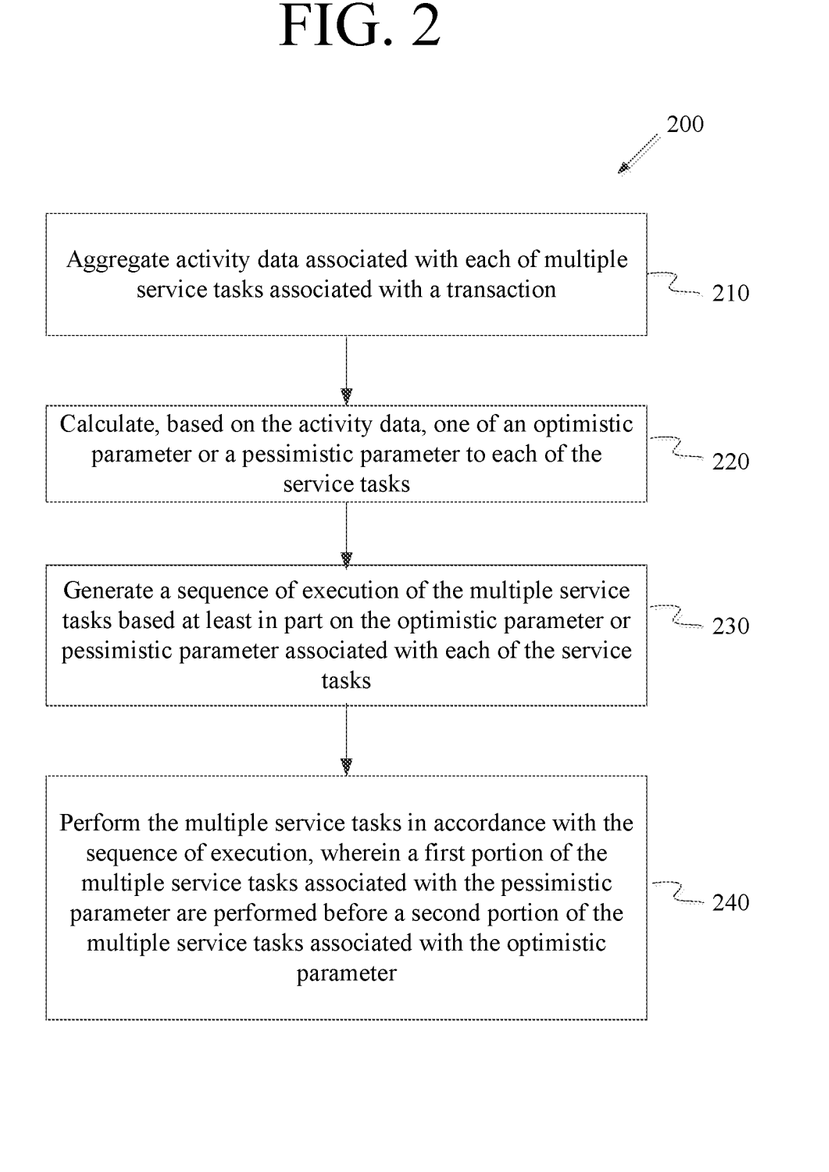
FIG. 2 is a flow diagram illustrating an example method of performing a transaction including multiple service tasks, according to one embodiment.

FIG. 2 illustrates a flowchart that provides an example of a process 200 executed by a system (e.g., transaction management system 110 of FIG. 1) operatively coupled to multiple computing services (e.g., services 100 of FIG. 1) to manage execution of a transaction having multiple components (e.g., tasks performed by the multiple services), according to various embodiments. It is understood that the flowchart of FIG. 2 provides an example of the many different types of functional arrangements that may be employed to implement the operation of the transaction management system, as described herein. Process 200 may be performed by a processing logic that may comprise hardware (e.g., circuitry, dedicated logic, programmable logic, microcode, etc.), software (e.g., instructions stored in a memory (e.g., memory 130) run on a processing device, such as processing device 120 of FIG. 1), or a combination thereof.

In block 210, the transaction management system aggregates activity data associated with each of the multiple service tasks associated with a transaction. In one embodiment, the activity data represents historical data associated with the various services and service tasks. For example, the activity data may include information relating to the performance of the service tasks such as a success rate, a failure rate, execution times, computation expense associated with the service task, a level of dependency associated with the service task, and any other suitable information or metrics that may be used to determine performance levels. In one embodiment, successful completion of a transaction includes the successful completion of all sub-steps, such that partially completed steps are backed-out (reversed) and a failure therein is reduced to an entry in a "dead-letter" queue for manual or exception processing. In one embodiment, the historical data may relate to performance and/or failure rate, while other embodiments may be domain or application-specific.

In block 220, based on the activity data, a belief level parameter is calculated for each of the service tasks. The belief level parameter may be a calculated score representing whether the service task is classified as optimistic or pessimistic. In one embodiment, based on the activity, one or more performance parameters are determined. The performance parameters may be any measurable metric associated with the performance of the service task. In one embodiment, the performance parameters include a probability of failure of a service (or service task) and an expense associated with a failure of the service (e.g., a computational expense, a time expense, a reversal expense, an impact on other service tasks, etc.). For example, the performance parameters may include an indication or calculated value associated with a probability of failure for a service task (e.g., a low, neutral, or high value). In another example, the performance parameters may include an impact (e.g., cost or expense) of a failure of service task (e.g., low cost, neutral cost, or high cost in terms of the time, resources, and complexity associated with reversal of the service task). In one embodiment, the performance parameters may be assigned a weight for use in the consideration and analysis of the performance parameters in calculating the belief level score.

In one embodiment, based on the performance parameters, a belief level score is calculated for each of the service tasks. The belief level score may be calculated for a particular service task as a relative score in comparison to other service tasks. In one embodiment, if the belief level score equals or exceeds a threshold value, the associated service task is classified as pessimistic and assigned a pessimistic parameter. In one embodiment, if the belief level score is less than the threshold value, the associated service task is classified as optimistic and assigned a pessimistic parameter. In one embodiment, the pessimistic parameter and the optimistic parameter may include the associated belief level score calculated for the respective service task.

In block 230, a sequence of execution of the multiple service tasks is generated based at least in part on the optimistic parameters and pessimistic parameters associated with the multiple service tasks. In one embodiment, the sequence of execution includes performing the service tasks in descending order of belief level score, beginning with the service task having the highest relative belief level score (e.g., the most pessimistic service task) and ending with the service task having the lowest relative belief level score (e.g., the most optimistic service task).

In block 240, the multiple service tasks associated with the transaction are performed in accordance with the identified sequence of execution. In one embodiment, a first portion of the multiple service tasks associated with the pessimistic parameter are performed before a second portion of the multiple service tasks associated with the optimistic parameter. In one embodiment, independent of the actual data and properties used for domain or application-specific belief calculations, an improved is achieved in the reduction of the frequency of reversals and the number of reversal steps in the event of an unsuccessful transaction.

Figure 3:
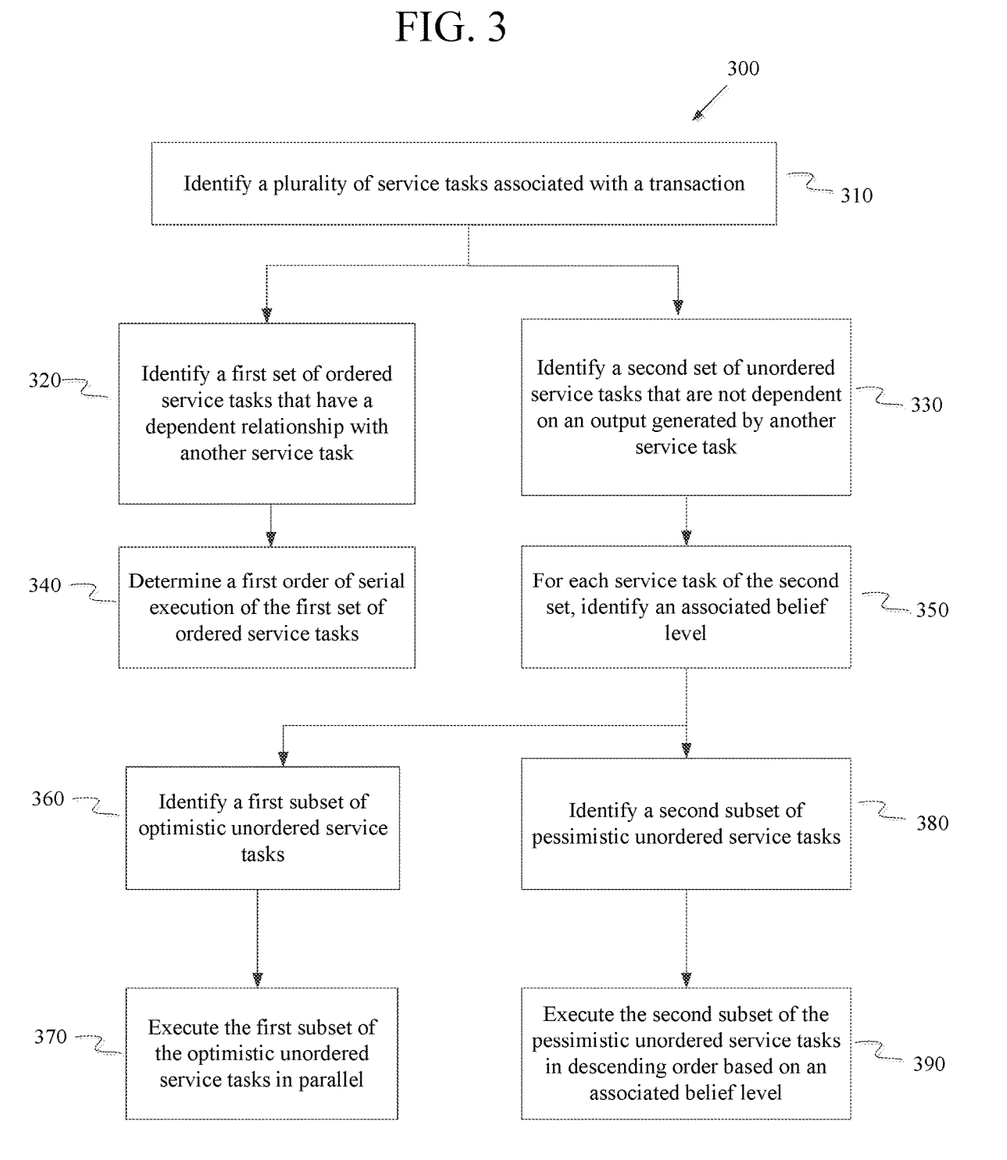
FIG. 3 is a flow diagram illustrating an example method of performing a transaction including multiple ordered and unordered service tasks, according to one embodiment.

FIG. 3 illustrates a flowchart that provides an example of a process 300 executed by a system (e.g., the transaction management system 110 of FIG. 1) to enable the execution of a transaction (e.g., a transaction requested by a client system) including tasks performed by multiple computing services (e.g., microservices), according to embodiments of the present disclosure. The process 300 illustrates the management of a hybrid transaction including both service tasks that are ordered (e.g., have a dependency relationship with another service task) and unordered (e.g., have no dependency relationship with another service tasks), according to embodiments of the present disclosure. It is noted that, in other examples, a transaction may be fully ordered (e.g., have no unordered service tasks) or fully unordered (e.g., have no ordered service tasks).

In block 310, multiple components (e.g., legs) or computing service tasks associated with a request transaction are identified. In one embodiment, the requested transaction may be analyzed to determine a quantity and type of external computing services (e.g., microservices) that are to be executed as part of the execution of the overall transaction. In one embodiment, a semantic and functional profile of each of the service tasks associated with the transaction may be identified.

In block 320, a first set of ordered service tasks is identified. In one embodiment, each of the service tasks in the first set of ordered service tasks are dependent on the one or more outcomes of one or more other service tasks.

In block 330, a second set of unordered service tasks is identified. In one embodiment, each of the service tasks in the second set of unordered service tasks has no dependency relationship with other service tasks.

In block 340, having identified the first set of ordered service tasks in block 330, a first order of execution of the first set of ordered service tasks is determined. In one embodiment, in view of the ordered nature of the service tasks, a serial execution sequence is identified. For example, if service task 2 uses as an input the result of service task 1, then the execution sequence indicates that service task 1 is performed first, followed by service task 2.

In block 350, having identified the second set of unordered service tasks in block 330, for each of the unordered service tasks, a belief level is identified. As described above, the believe level may include a score or rating representing a relative optimistic or pessimistic strategy associated with a particular service task. In one embodiment, based on historical activity data associated with a service task, one or more performance parameters are determined (e.g., a probability of failure of the service task, an expense associated with failure of the service task, etc.) are determined. In one embodiment, using the performance parameters, a belief level score is calculated. The belief level score may be a numerical representation of a relative optimism or pessimism level for a service task. In one embodiment, a relative scale (e.g., a scale of 0 to 10) may be employed to rank or compare the levels of belief (optimism or pessimism) for each of the service tasks. In one embodiment, a threshold value may be established and used for comparison with the calculated belief level score for a service task. In one embodiment, a first category of "optimistic" service tasks may include the service tasks having a belief level score in a range between a lower limit of the scale (e.g., a score of 0) and the threshold value. In one embodiment, a second a first category of "pessimistic" service tasks may include the service tasks having a belief level score in a range between the threshold value and an upper limit of the scale (e.g., a score of 10).

In block 360, a first subset of the optimistic unordered service tasks is identified. In one embodiment, the first subset includes all of the service tasks that have been designated as "optimistic" based on a respective belief level score, in block 350. In block 370, due to the unordered and optimistic (e.g., a relatively low probability of failure, a relatively low expense associated with a failure, or a combination thereof) classification of the service tasks, the first subset of service tasks are executed in parallel.

In block 380, a second subset of pessimistic unordered service tasks are identified. In one embodiment, the second subset includes all of the service tasks that have been designated as "pessimistic" based on a respective belief level score, in block 350. In one embodiment, the second subset includes the one or more service tasks having a belief level score exceeding the pessimistic threshold value. In block 390, due to the unordered and pessimistic (e.g., a relatively high probability of failure, a relatively high expense associated with a failure, or a combination thereof) classification of the service tasks, the second subset of service tasks are executed in descending order based on an associated belief level. For example, for a second subset including service task A having a belief level score of 8.5, service task B having a belief level score of 7.4, and service task C having a belief level score of 9.4, the order of execution is identified as: 1) service task C, 2) service task A, and 3) service task B.

Figure 4:
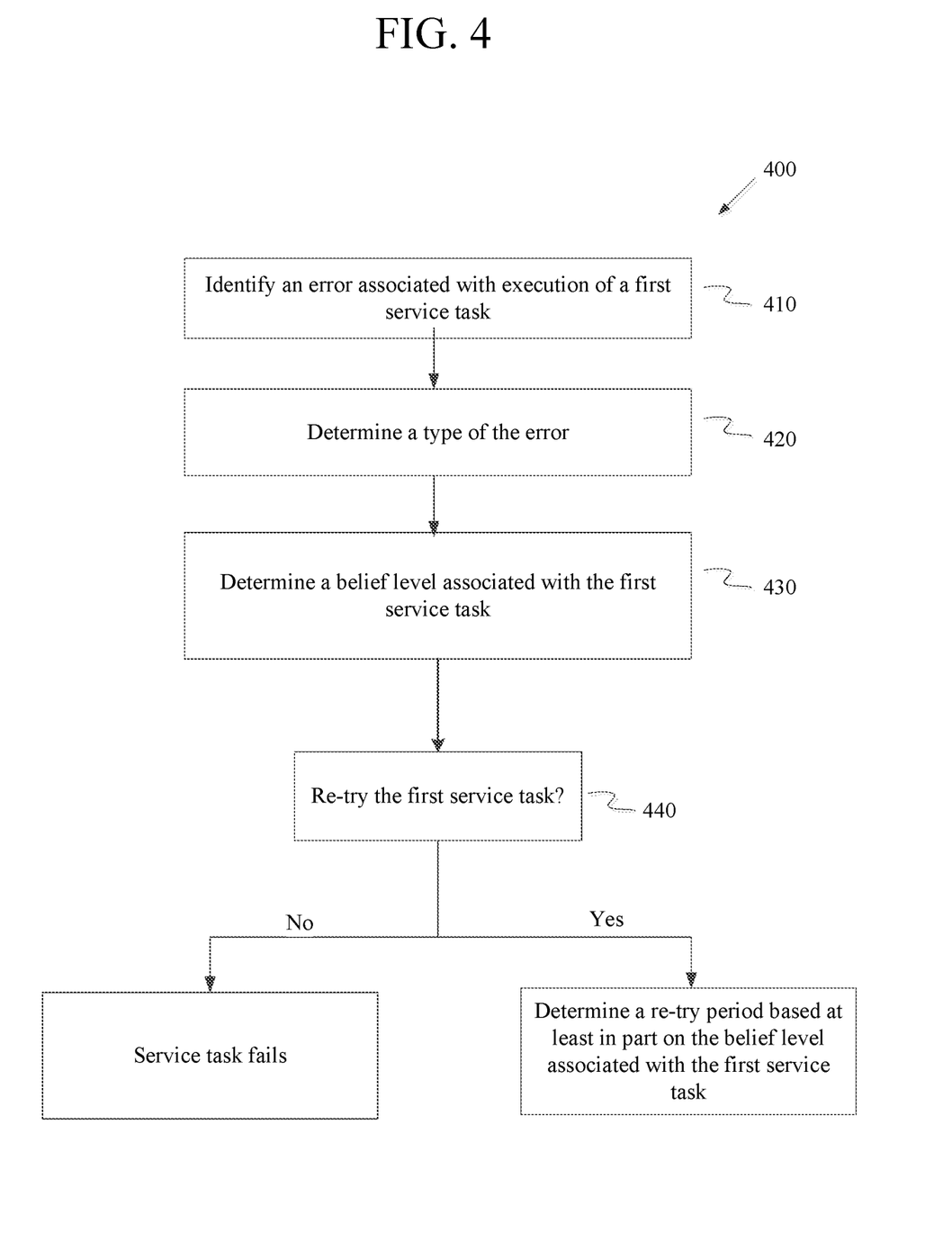
FIG. 4 is a flow diagram illustrating an example method of handling errors associated with a transaction including multiple ordered and unordered service tasks, according to one embodiment.

FIG. 4 illustrates a flowchart that provides an example of a process 400 executed by a system (e.g., the transaction management system 110 of FIG. 1) to enable the handling of errors in the execution of a transaction (e.g., a transaction requested by a client system) including tasks performed by multiple computing services (e.g., microservices), according to embodiments of the present disclosure.

In block 410, an error associated with the execution of a transaction including multiple microservices is identified. In one embodiment, any suitable error detection methodology may be employed to identify an error in the execution of a service associated with the multi-service transaction.

In block 420, the error is analyzed to determine a type, category, or classification of the error. Example error types may include, but are not limited to, a connection timeout, exceeding a maximum execution time, a known error response (e.g., a duplicate task error), an unknown error response (e.g., insufficient resources), etc. In block 430, a belief level value for the service task associated with the error is identified (e.g., the score indicating whether the service task is optimistic or pessimistic).

In block 440, based on the error type, a determination is made whether to retry the service task. In one embodiment, a retry decision may be associated with each of the error types. For example, a connection timeout may result in a retry of the service task, while a duplicate task error may result in a cancellation of the service task (e.g., a no retry decision).

In one embodiment, if a no retry determination is made, the service task fails. In one embodiment, as shown in FIG. 4, if a retry determination is made, a retry period is identified based at least in part on the belief level score associated with the service task. In one embodiment, the retry period is an amount of time during which the service task is re-tried before reaching a final determination of failure for the service task. In one embodiment, the higher the belief level score, the larger the retry period. In one embodiment, if a service task has a high pessimistic score (e.g., 9.1 on a scale of 0 to 10), a longer retry period is established, in view of the presumed high expense of backing out or reversing the service task. Likewise, if a service task is highly optimistic (e.g., has a relative low belief level score), the shorter the assigned retry period. In one embodiment, the retry period may be calculated as a function of the belief level score, wherein the higher the belief level score, the longer the retry period.

In one embodiment, reversals or back-outs of a service task may be performed. In one embodiment, a state of the service task is identified and maintained, prior to initiation of the service task. In one embodiment, a reversal of failed transaction request to a service task involves the restoration of the state of the request prior to initiation of the transaction. In one embodiment, upon identification of a transaction failure, a request is issued to return the one or more service tasks to an original state. In one embodiment, retry logic is implemented that maintains the notion of a failed state if the retries continue past a threshold associated with the retry period. In such instances, if the retry period expires before the successful execution of the service task, the service task is considered a failure and retry is stopped (e.g., the system failed during the transaction request and did not return to operation during the allowed retry window of time). In one embodiment, upon reaching the limit of the retry window, a record associated with the service task is flagged as being in an "inconsistent" state, and a queue (e.g., the dead letter queue 138 of FIG. 1) is implemented to restore the service task to a consistent state and remove the flag upon completion. In one embodiment, processing of requests to the various related services may be terminated until the state changes from "inconsistent" to "consistent."

Figure 5:
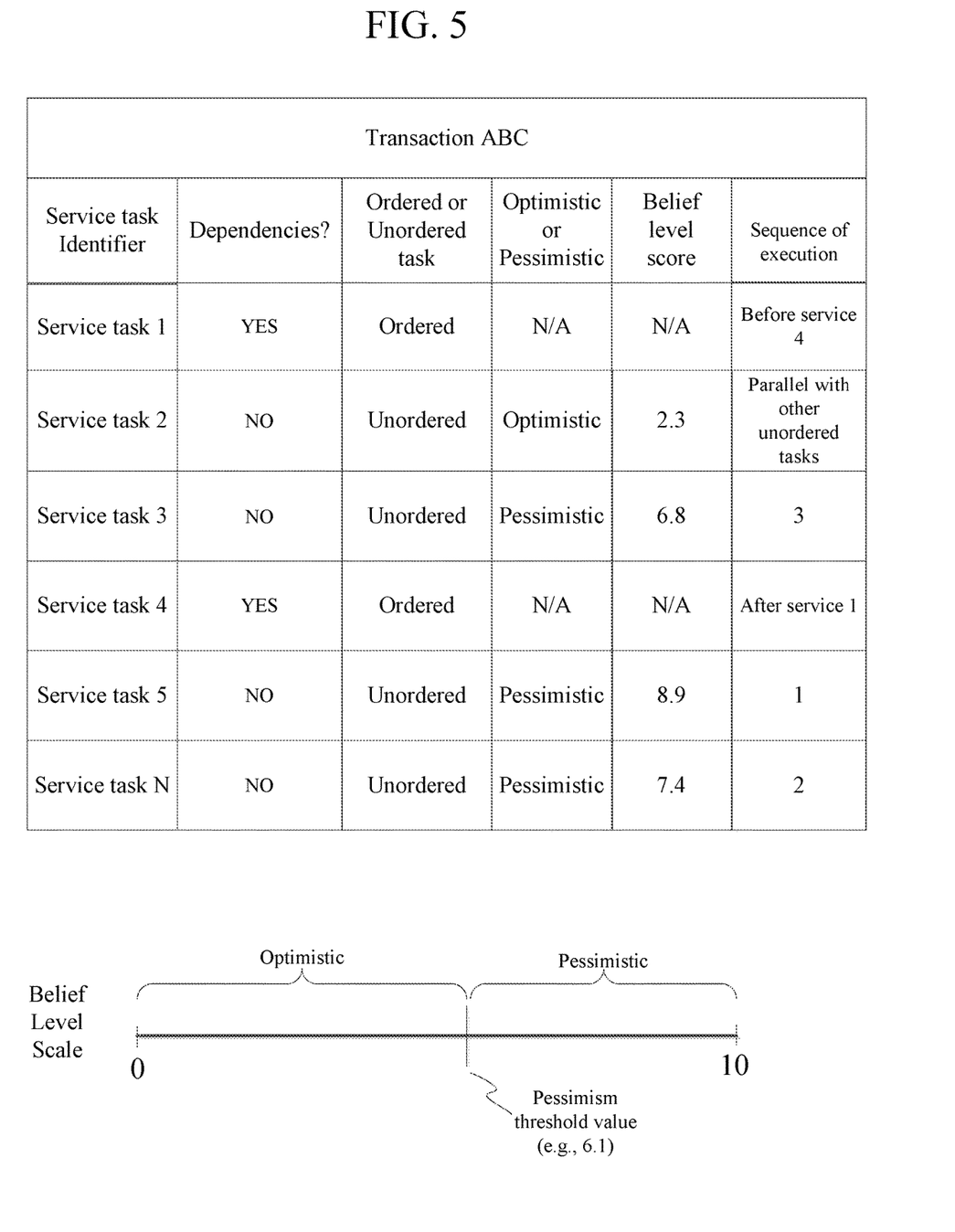
FIG. 5 illustrates an example table including information associated with multiple service tasks associated with a transaction, according to one embodiment.

FIG. 5 illustrates an example involving the management of a transaction (e.g., Transaction ABC) including multiple services performing multiple service tasks (e.g., Service task 1, Service Task 2, Service Task 3, Service Task 4, Service Task 5, and Service Task N). FIG. 5 depicts an example table including data collected, calculated, and managed by a transaction management system as it relates to Transaction ABC, according to embodiments. As shown in FIG. 5, various information is identified for each service task associated with Transaction ABC, including a service task identifier, identified dependencies, classification as ordered or unordered, classification as optimistic or pessimistic, a calculated belief level score, and a sequence of execution associated with the respective service tasks.

In this example, it is determined that service task 4 is dependent on the output or result of service task 1, therefore these service tasks are classified as ordered. Accordingly, a sequence of execution is established for service tasks 1 and 4 based on the identified dependent relationship, such that service task 1 is performed before service task 4.

In this example, service tasks 2, 3, 5, and N are identified as having no dependencies and, therefore, are classified as unordered. For each of the unordered service tasks, a belief level score is calculated and compared to one another using a belief level scale, such as the one shown in FIG. 5. In this example, a pessimism threshold value of 6.1 is set, such that a service task having a belief level score below 6.1 is categorized as optimistic. Furthermore, a service task having a belief level score at or above 6.1 is categorized as pessimistic.

In one embodiment, service tasks identified as unordered and optimistic (e.g., service task 2) are executed in parallel with other service tasks. As shown in FIG. 5, service tasks 3, 5, and N are identified as unordered and pessimistic. A sequence of execution is identified for these service tasks wherein the tasks are performed in descending order based on their respective belief level score. In this example, service task 5 has a belief level score of 8.9 (i.e., the relative highest belief level score) and is executed first. In this example, service task N (having a belief level score of 7.4) is executed next, followed by service task 3 (having a belief level score of 6.8).

Advantageously, the performance of the transaction execution system is improved in view of the formulation of the belief-level based sequence of execution. Efficiencies are realized in that the performance parameters (e.g., a probability of failure and an expense of failure) are considered in the calculation of the belief level score and associated sequence of execution. Accordingly, in one embodiment, an unordered service task having a high probability of failure, a high expense of failure, or a combination thereof is advantageously performed before other more optimistic service tasks.

Figure 6:
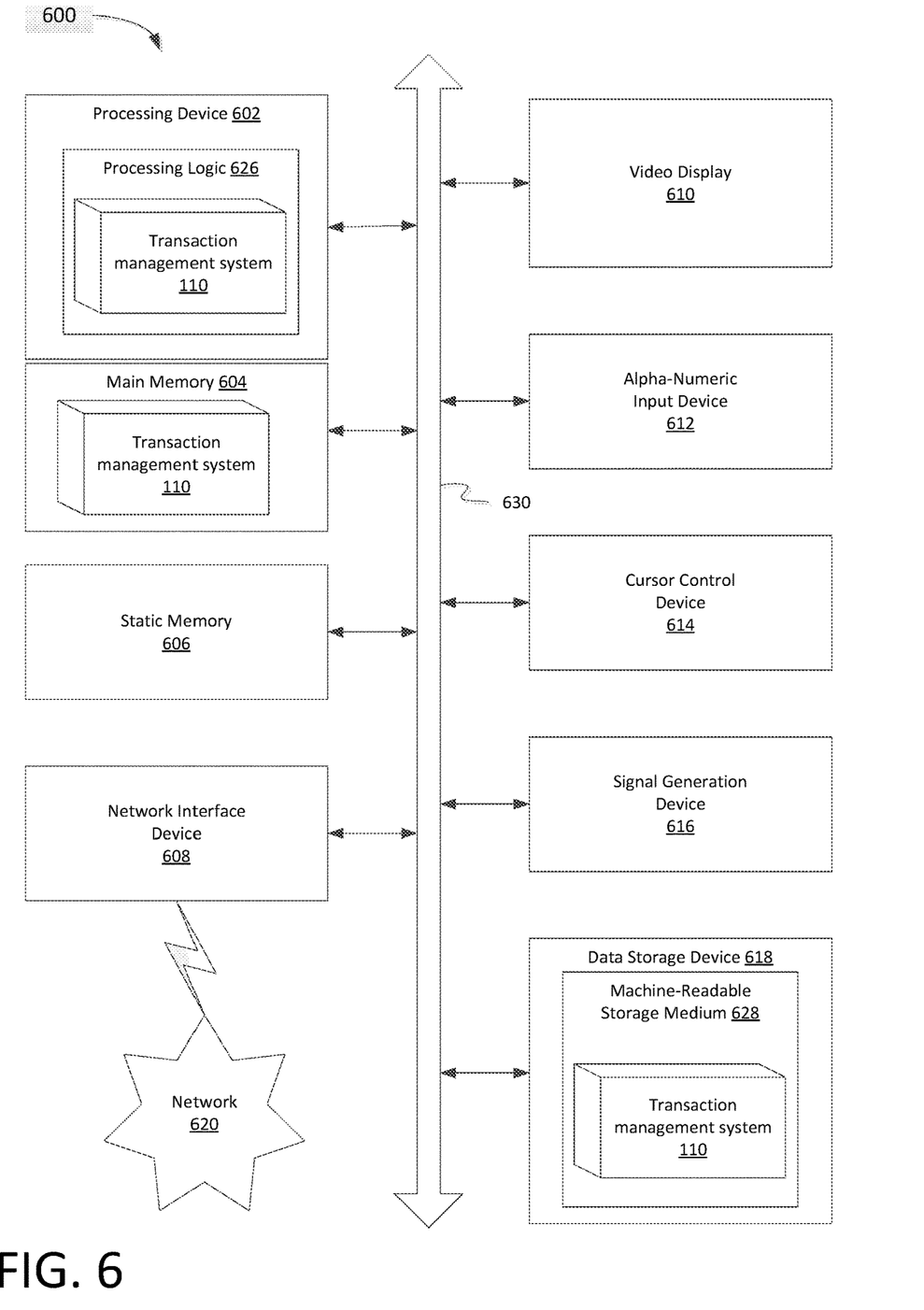
FIG. 6 is a schematic block diagram that provides an example illustration of a computing environment executing instructions relating to managing a multi-component transaction management system, according to one embodiment.

FIG. 6 illustrates a diagrammatic representation of a machine in the example form of a computer system 600 including a set of instructions executable by a transaction management system (e.g., transaction management system 110 of FIG. 1) to cause the system to perform any one or more of the methodologies discussed herein. In one embodiment, the transaction management system operates in a computing environment including operatively coupled services configured to perform tasks associated with a transaction request to be executed on behalf of a customer or client system. In one embodiment, the transaction management system may include instructions to enable execution of the processes and corresponding components shown and described in connection with FIGS. 1-5.

In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. In various implementations of the present disclosure, the processing device 602 is configured to execute instructions for the transaction management system for performing the operations and processes described herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable medium 628 on which is stored one or more sets of instructions of the transaction management system embodying any one or more of the methodologies or functions described herein. The instructions may also reside, completely or at least partially, within the main memory 604 and/or within processing logic 626 of the processing device 602 during execution thereof by the computer system 600, the main memory 604 and the processing device 602 also constituting computer-readable media.

The instructions may further be transmitted or received over a network 620 via the network interface device 608. While the computer-readable storage medium 628 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying", "determining", "executing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method to optimize execution of a plurality of service tasks associated with a transaction, the method comprising:
   identifying the plurality of service tasks associated with the transaction requested by a customer system;
   identifying:
      a first set of ordered service tasks of the plurality of service tasks that have a dependent relationship with one or more other service tasks of the plurality of service tasks, and
      a second set of unordered service tasks of the plurality of service tasks that are independent from other service tasks of the plurality of service tasks;
   determining a sequence of serial execution of the first set of ordered service tasks;
   executing the first set of ordered service tasks in the sequence;
   determining a belief score for each of the second set of unordered service tasks, wherein the belief score represents at least one of a probability of failure of a service task or an expense associated with the failure of the service task;
   identifying a first subset of the second set of unordered service tasks having a respective belief score greater than or equal to a threshold value;
   identifying a second subset of the second set of unordered service tasks having a respective belief score less than the threshold value;
   executing, in descending order of the respective belief score, the first subset of the second set of unordered service tasks; and
   in response to completion of the execution of the first subset of the second set of unordered service tasks, executing, in parallel, the second subset of the second set of unordered service tasks.

2. The method of claim 1, wherein execution of the first set of ordered service tasks, the first subset of the unordered service tasks, and the second subset of unordered service tasks results in execution of the transaction.

3. The method of claim 1, further comprising identifying an error associated with a first service task of the plurality of service tasks.

4. The method of claim 3, further comprising:
   determining a type of the error associated with the first service task; and
   determining a first belief score associated the first service task.

5. The method of claim 4, further comprising determining a retry period of time associated with the first service task based at least in part on the type of error and the first belief score.

6. A system to optimize execution of a plurality of service tasks associated with a transaction, the system comprising:
   a processing device; and
   a memory to store computer-executable instructions that, if executed, cause the processing device to:
   identify the plurality of service tasks associated with the transaction requested by a customer system;
   identify:
      a first set of ordered service tasks of the plurality of service tasks that have a dependent relationship with one or more other service tasks of the plurality of service tasks, and
      a second set of unordered service tasks of the plurality of service tasks that are independent from other service tasks of the plurality of service tasks;
   determine a sequence of serial execution of the first set of ordered service tasks;
   execute the first set of ordered service tasks in the sequence;
   determine a belief score for each of the second set of unordered service tasks wherein the belief score represents at least one of a probability of failure of a service task or an expense associated with the failure of the service task;
   identify a first subset of the second set of unordered service tasks having a respective belief score greater than or equal to a threshold value;
   identify a second subset of the second set of unordered service tasks having a respective belief score less than the threshold value;
   execute, in descending order of the respective belief score, the first subset of the second set of unordered service tasks; and
   in response to completion of the execution of the first subset of the second set of unordered service tasks, execute, in parallel, the second subset of the second set of unordered service tasks.

7. The system of claim 6, wherein execution of the first set of ordered service tasks, the first subset of the unordered service tasks, and the second subset of unordered service tasks results in execution of the transaction.

8. The system of claim 6, the processing device to identify an error associated with a first service task of the plurality of service tasks.

9. The system of claim 8, the processing device to:
determine a type of the error associated with the first service task; and
determine a first belief score associated the first service task.

10. The system of claim 9, the processing device to:
determining a retry period of time associated with the first service task based at least in part on the type of error and the first belief score.

11. A non-transitory computer-readable storage device storing computer-executable instructions to optimize execution of a plurality of service tasks associated with a transaction, the instructions, if executed by a processing device, cause the processing device to:
identify the plurality of service tasks associated with the transaction requested by a customer system;
identify:
a first set of ordered service tasks of the plurality of service tasks that have a dependent relationship with one or more other service tasks of the plurality of service tasks, and
a second set of unordered service tasks of the plurality of service tasks that are independent from other service tasks of the plurality of service tasks;
determine a sequence of serial execution of the first set of ordered service tasks;
execute the first set of ordered service tasks in the sequence;
determine a belief score for each of the second set of unordered service tasks wherein the belief score represents at least one of a probability of failure of a service task or an expense associated with the failure of the service task;
identify a first subset of the second set of unordered service tasks having a respective belief score greater than or equal to a threshold value;
identify a second subset of the second set of unordered service tasks having a respective belief score less than the threshold value;
execute, in descending order of the respective belief score, the first subset of the second set of unordered service tasks; and
in response to completion of the execution of the first subset of the second set of unordered service tasks, execute, in parallel, the second subset of the second set of unordered service tasks.

12. The non-transitory computer-readable storage device of claim 11, wherein execution of the first set of ordered service tasks, the first subset of the unordered service tasks, and the second subset of unordered service tasks results in execution of the transaction.

13. The non-transitory computer-readable storage device of claim 11, the processing device to identify an error associated with a first service task of the plurality of service tasks.

14. The non-transitory computer-readable storage device of claim 13, the processing device to:
determine a type of the error associated with the first service task;
determine a first belief score associated the first service task; and
determine a retry period of time associated with the first service task based at least in part on the type of error and the first belief score.

* * * * *